United States Patent
Fukano et al.

(10) Patent No.: US 7,187,089 B2
(45) Date of Patent: Mar. 6, 2007

(54) ELECTRIC STEERING LOCK APPARATUS FOR PROTECTING ACTUATOR FROM OVERHEATING

(75) Inventors: Yuji Fukano, Aichi (JP); Kenji Tanaka, Aichi (JP); Mitsuo Mori, Aichi (JP); Tomoyuki Funayama, Toyota (JP); Mikito Yagyu, Toyota (JP); Tomoo Kakegawa, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 455 days.

(21) Appl. No.: 10/753,768

(22) Filed: Jan. 7, 2004

(65) Prior Publication Data
US 2004/0221628 A1    Nov. 11, 2004

(30) Foreign Application Priority Data
Jan. 10, 2003    (JP) .............................. 2003-004834

(51) Int. Cl.
*H02H 11/00* (2006.01)
*B60L 3/00* (2006.01)
(52) U.S. Cl. ...................................... 307/100; 307/9.1

(58) Field of Classification Search ................ 307/100, 307/9.1
See application file for complete search history.

(56) References Cited

U.S. PATENT DOCUMENTS
5,168,415 A    12/1992    Osuga
5,838,591 A    11/1998    Yamaguchi
6,295,848 B1   10/2001    Suzuki

FOREIGN PATENT DOCUMENTS
JP         11-105673       4/1999

*Primary Examiner*—Brian Sircus
*Assistant Examiner*—Dru Parries
(74) *Attorney, Agent, or Firm*—Patterson, Thuente, Skaar & Christensen, P.A.

(57) ABSTRACT

An electric steering lock apparatus that protects an actuator from overheating without enlarging the actuator. The electric steering lock apparatus includes a lock pin engaged with a steering shaft to lock the steering shaft. An actuator moves the lock pin between a lock position in which the lock pin is engaged with the steering shaft and an unlock position in which the lock pin is disengaged from the steering shaft. A control unit controls the actuator. The control unit generates a calculated value related to operation time of the actuator and suspends operation of the actuator when the calculated value is greater than a predetermined operation suspension threshold value.

18 Claims, 5 Drawing Sheets

Fig.5(a)
Addition

Fig.5(b)
Subtraction

ELECTRIC STEERING LOCK APPARATUS FOR PROTECTING ACTUATOR FROM OVERHEATING

BACKGROUND OF THE INVENTION

The present invention relates to an electric steering lock apparatus, and more particularly, to an electric steering lock apparatus that protects an incorporated actuator from being overheated.

Mechanical steering lock apparatuses have conventionally been used to prevent vehicles from being stolen.

Japanese Laid-Open Patent Publication No. 11-105673 describes a mechanical steering lock apparatus having a key cylinder. A mechanical key is inserted in the key cylinder and turned to move a lock pin, which is engaged with and disengaged from a steering shaft. The engagement of the lock pin with the steering shaft locks the steering shaft and restricts the rotation of the steering wheel. The rotation restriction improves the security of the vehicle with respect to automobile thefts.

In recent years, to improve the maneuverability of a vehicle, a one-push type engine start/stop system having a button switch for starting and stopping an engine has been proposed. In a steering lock apparatus (electric steering lock apparatus) for such a start/stop system, an actuator moves a lock pin that is engaged with and disengaged from the steering shaft. A lock control unit controls the actuator.

In the electric steering lock apparatus of the prior art, frequent locking and unlocking of the steering shaft may overheat the actuator (motor) and cause thermal damage, such as line breakage of a coil. A motor provided with an overheat protection function may be employed to prevent such thermal damage. However, such a motor provided with an overheat protection function would have a bimetallic hardware structure. This would increase the size and cost of the motor. Accordingly, the employment of a motor provided with an overheat protection function would enlarge the steering lock apparatus and increase the manufacturing cost.

SUMMARY OF THE INVENTION

It is an object of the present invention to provide an electric steering lock apparatus that protects an actuator from overheating without enlarging the actuator.

To achieve the above object, the present invention provides an electric steering lock apparatus for locking a steering shaft. The steering lock apparatus includes a lock pin engageable with the steering shaft to lock the steering shaft. An actuator moves the lock pin between a lock position in which the lock pin is engaged with the steering shaft and an unlock position in which the lock pin is disengaged from the steering shaft. A control unit controls the actuator. The control unit generates a calculated value related to operation time of the actuator and suspends operation of the actuator when the calculated value is greater than a predetermined operation suspension threshold value.

A further aspect of the present invention is a method for controlling an actuator that drives a lock pin used to lock a steering shaft in an electric steering lock apparatus. The method includes determining whether the actuator is being operated to move the lock pin, increasing a calculated value by performing an addition when the actuator is operating, decreasing the calculated value by performing a subtraction when the operation of the actuator is suspended, and suspending the operation of the actuator when the calculated value is greater than an operation suspension threshold value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electric steering lock apparatus 1 according to a preferred embodiment of the present invention will now be described with reference to the drawings.

Figure 1A:
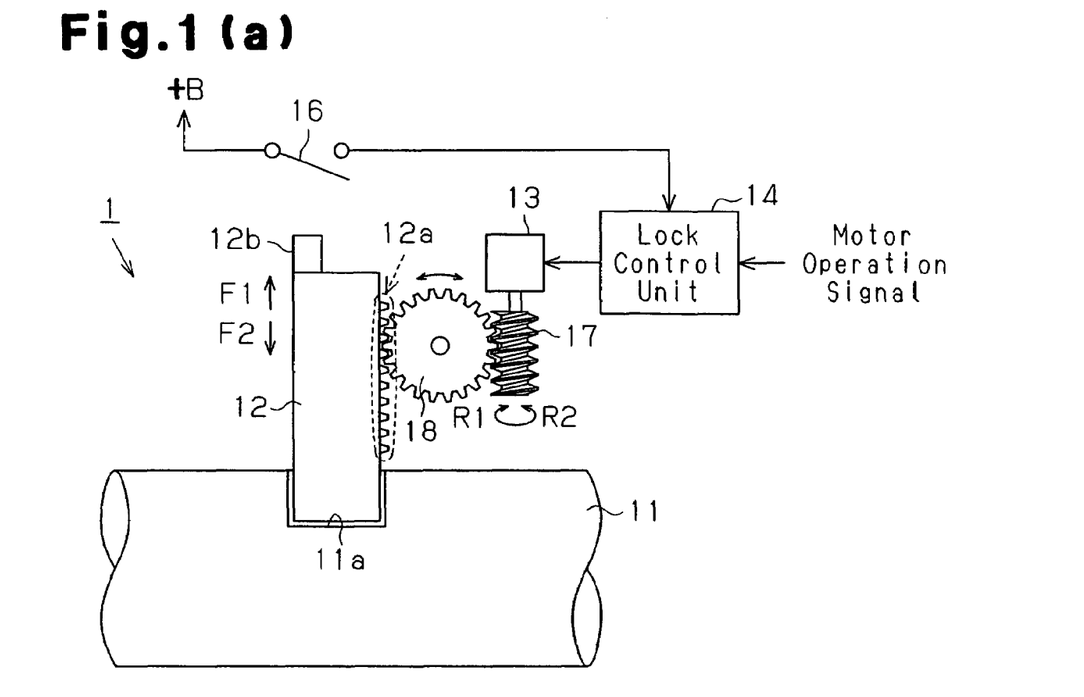
FIGS. 1(a) and 1(b) are schematic block diagrams of a steering lock apparatus according to a preferred embodiment of the present invention.
Figure 1B:
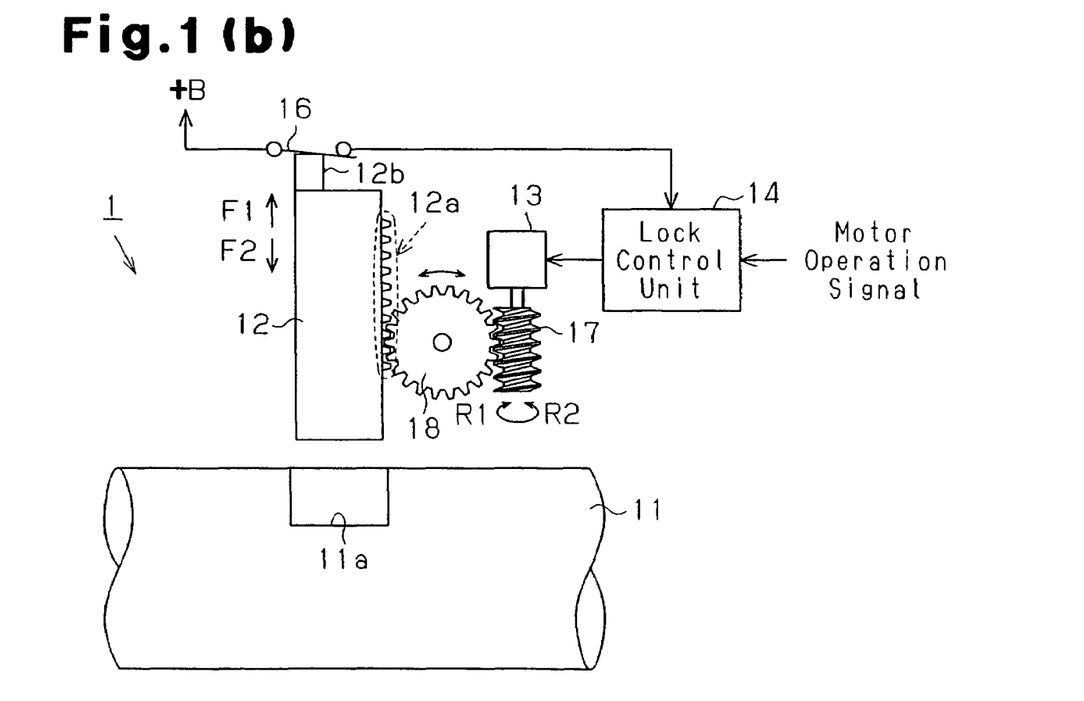

Referring to FIGS. 1(a) and 1(b), the electric steering lock apparatus 1 includes a steering shaft 11, a lock pin 12, a motor 13 serving as an actuator, and a lock control unit 14. The lock control unit 14 is connected to a detection switch 16. In the preferred embodiment, the detection switch 16 is preferably a normally opened (A-contact) mechanical switch (limit switch in the preferred embodiment). The detection switch 16 has one terminal connected to a positive terminal of a battery and another terminal connected to the lock control unit 14.

The lock control unit 14 controls the motor 13 and drives the motor 13 with a drive signal. The motor 13 has a rotation shaft fixed to a worm gear 17. The worm gear 17 is rotatably engaged with a gear 18.

The lock pin 12 has a first end that is engaged with and disengaged from a socket 11a in the peripheral surface of the steering shaft 11. Engagement of the lock pin 12 with the socket 11a (as shown in the state of FIG. 1(a)) restricts the rotation of the steering shaft 11. Disengagement of the lock pin 12 from the socket 11a (as shown in the state of FIG. 1(b)) enables the rotation of the steering shaft 11.

A rack 12a is formed on the peripheral surface of the lock pin 12 and meshed with the gear 18. Accordingly, rotation of the gear 18 moves the lock pin 12 in a direction perpendicular to the axial direction of the steering shaft 11 (the directions indicated by arrows F1 and F2 in FIG. 1(a)). In other words, the lock pin 12 is engaged with and disengaged from the steering shaft 11 by the motor 13.

The lock pin 12 has a second end on which a switch boss 12b is formed. Referring to FIG. 1(a), the steering shaft 11 is locked when the lock pin 12 is engaged with the socket 11a of the steering shaft 11. In this state, the boss 12b does not contact the detection switch 16. Thus, the detection switch 16 is opened when the steering shaft 11 is locked. In this state, the lock control unit 14 is provided with a signal having a low level. The lock control unit 14 acknowledges the locking of the steering shaft 11 from the low signal.

Referring to FIG. 1(*b*), the steering shaft 11 is unlocked when the lock pin 12 is disengaged from the socket 11*a*. In this state, the boss 12*b* is in contact with the detection switch 16. This closes the detection switch 16 and causes the signal provided to the lock control unit 14 to go high. The lock control unit 14 acknowledges the unlocking of the steering shaft 11 from the high signal. The detection switch 16 is closed when the lock pin 12 is completely disengaged from the socket 11*a* of the steering shaft 11.

The lock control unit 14 includes a driver circuit (not shown) that drives a microcomputer (not shown) and the motor 13. In response to a motor operation signal requesting the unlocking of the steering shaft 11, the lock control unit 14 provides the motor 13 with an unlock drive signal. Subsequently, the motor 13 rotates its rotation shaft in the direction indicated by arrow R1 to move the lock pin 12 in the direction indicated by arrow F1 (away from the steering shaft 11). The movement of the lock pin 12 disengages the lock pin 12 from the socket 11*a* of the steering shaft 11 and closes the detection switch 16, as shown in the state of FIG. 1(*b*). The lock control unit 14 then acknowledges via the high signal of the detection switch 16 that the steering shaft 11 has been unlocked.

In response to a motor operation signal requesting the locking of the steering shaft 11, the lock control unit 14 provides the motor 13 with a lock drive signal. Subsequently, the motor 13 rotates its rotation shaft in the direction indicated by arrow R2 to move the lock pin 12 in the direction indicated by arrow F2 (toward the steering shaft 11). The movement of the lock pin 12 engages the lock pin 12 with the socket 11*a* of the steering shaft 11 and opens the detection switch 16, as shown in the state of FIG. 1(*a*). The lock control unit 14 then acknowledges via the low signal of the detection switch 16 that the steering shaft 11 has been locked.

The lock control unit 14 increases or decreases a counter value Cptc based on the operation time and operation suspension time of the motor 13 to control the motor 13 based on the counter value Cptc. The increase and decrease of the counter value Cptc and the control of the motor 13 based on the counter value Cptc that are performed by the lock control unit 14 will now be discussed with reference to the flowchart of FIG. 2.

Figure 2:
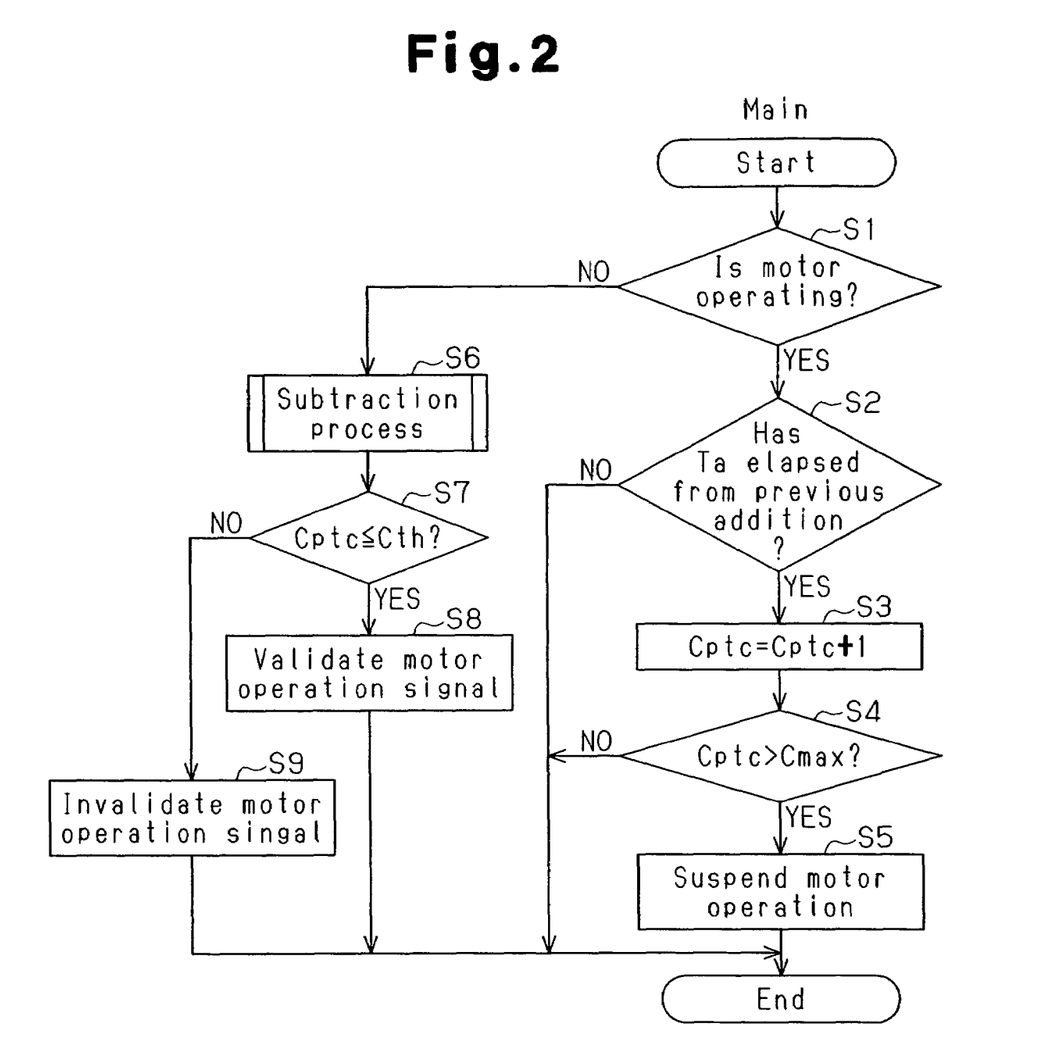
FIG. 2 is a flowchart of a process executed by a lock control unit in the preferred embodiment.

In step S1, the lock control unit 14 determines whether or not the motor 13 is operating. When the motor 13 is operating, in step S2, the lock control unit 14 determines whether an addition time interval Ta has elapsed from the previous addition (incrementing) of the counter value Cptc.

A value is added to or subtracted from the counter value Cptc at predetermined time intervals. Accordingly, the counter value Cptc functions as a variable that is used to simulate the temperature change of the motor 13. The value of one is added to or subtracted from the counter value Cptc by the lock control unit 14 at predetermined time intervals to predict the temperature of the motor 13 based on the counter value Cptc. The initial counter value Cptc corresponds to the temperature of the motor 13 before the motor 13 is operated (hereafter referred to as prior operation temperature). In the preferred embodiment, the initial counter value Cptc is set at "0". Accordingly, the counter value Cptc indicates the temperature change relative to the prior operation temperature.

The addition time interval Ta, which is calculated beforehand from the temperature increase rate of the motor 13, is the time interval at which the counter value Cptc undergoes the addition process. In the preferred embodiment, the addition time interval Ta is set at 24 milliseconds.

If the addition time interval Ta has elapsed in step S2, the lock control unit 14 adds "1" to the counter value Cptc in step S3. If the addition time interval Ta has not elapsed in step S2, the lock control unit 14 temporarily terminates processing. That is, the lock control unit 14 performs the process of step S3 when the addition time interval Ta elapses. Thus, the lock control unit 14 performs the process of step S3 and increases the counter value Cptc by "1" whenever the addition time interval Ta elapses. In the preferred embodiment, the lock control unit 14 increases the counter value Cptc by "1" whenever 24 milliseconds elapses during operation of the motor 13. Accordingly, the counter value Cptc increases in proportion to the operation time of the motor 13.

When the motor 13 starts operating, in step S2, the lock control unit 14 first determines whether or not the addition time interval Ta has elapsed from when the motor 13 started to operate.

After performing the process of step S3, the lock control unit 14 determines whether or not the counter value Cptc is greater than an operation suspension threshold value Cmax in step S4. The operation suspension threshold value Cmax corresponds to the counter value Cptc at which the operation of the motor 13 is forcibly suspended. Since the initial counter value Cptc is "0", the operation suspension threshold value Cmax corresponds to the tolerated upper temperature limit of the motor 13. In the preferred embodiment, assuming that the motor 13 operates in an environment of "85° C." and that the upper temperature limit of the motor 13 is "180° C.", the calculation of "180–85" is performed and the result of "95" is set as the operation suspension threshold value Cmax. When the counter value Cptc is greater than the operation suspension threshold value Cmax in step S4, the lock control unit 14 suspends the operation of the motor 13 in step S5. When the counter value Cptc is less than or equal to the operation suspension threshold value Cmax, the lock control unit 14 temporarily terminates processing.

When the motor 13 is not operating in step S1, the lock control unit 14 performs a subtraction process in step S6. The subtraction process performed of step S6 will now be discussed with reference to FIG. 3.

Figure 3:
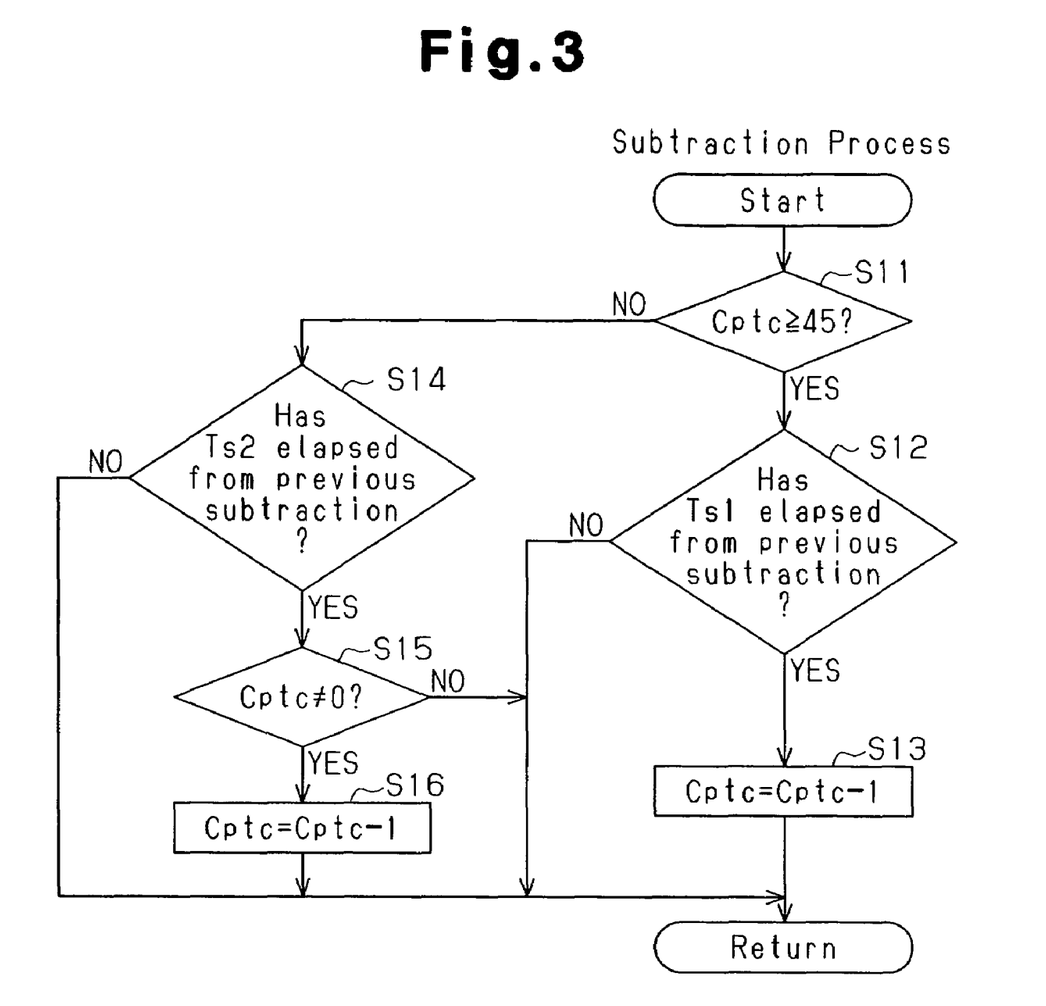
FIG. 3 is a flowchart of a subtraction process executed by the lock control unit in the preferred embodiment.

In step S11 of FIG. 3, the lock control unit 14 determines whether or not the counter value Cptc is "45" or greater. In step S12, the lock control unit 14 determines whether or not a first subtraction time interval Ts1 has elapsed from the previous subtraction (decrementing) of the counter value Cptc.

A subtraction time interval is calculated beforehand from the temperature decrease rate of the motor 13 and is the interval at which the counter value Cptc undergoes the subtraction process. In the preferred embodiment, two subtraction time intervals are used. The first subtraction time interval Ts1 is used when the counter value Cptc is greater than or equal to "45". The second subtraction time interval Ts2 is used when the counter value Cptc is "45" or less. In the preferred embodiment, the first subtraction time interval Ts1 is set at 0.5 seconds and the second subtraction time interval Ts2 is set at 11 seconds.

If the first subtraction time interval Ts1 has elapsed in step S12, the lock control unit 14 subtracts "1" from the counter value Cptc in step S13. If the first subtraction time interval Ts1 has not elapsed in step S12, the lock control unit 14 temporarily terminates processing. That is, the lock control unit 14 performs the process of step S13 when the first subtraction time interval Ts1 elapses. Thus, the lock control unit 14 performs the process of step S13 and decreases the counter value Cptc by "1" whenever the first subtraction time interval Ts1 elapses. In the preferred embodiment, if the counter value Cptc is "45" or greater, the lock control unit 14 decreases the counter value Cptc by "1" whenever 0.5 seconds elapses when operation of the motor 13 is suspended. Accordingly, the counter value Cptc decreases in proportion to the operation suspension time of the motor 13.

If the counter value Cptc is not "45" or greater, or less than "45", in step S11, the lock control unit 14 determines whether or not the second subtraction time interval Ts2 has elapsed from the previous subtraction (decrementing) of the counter value Cptc in step S14. If the second subtraction time interval Ts2 has not elapsed in step S14, the lock control unit 14 temporarily terminates processing. That is, the lock control unit 14 performs the process of step S15 when the second subtraction time interval Ts2 elapses. Thus, if the counter value Cptc is less than 45, the lock control unit 14 performs the processes subsequent to step S15 whenever the second subtraction time interval Ts2 elapses.

When the second subtraction time interval Ts2 elapses in step S14, the lock control unit 14 determines whether or not the counter value Cptc is "0" in step S15. When the counter value Cptc is not "0", the lock control unit 14 subtracts "1" from the counter value Cptc in step S16. In the preferred embodiment, the second subtraction time interval Ts2 is 11 seconds. Accordingly, if the counter value Cptc is less than "45" when the motor 13 is not operating 13, the lock control unit 14 subtracts "1" from the counter value Cptc every 11 seconds. The counter value Cptc thus decreases in proportion to the operation suspension time of the motor 13. When the counter value Cptc is "0" in step S15, the lock control unit 14 temporarily terminates processing. In other words, the counter value Cptc never becomes less than "0" since the lock control unit 14 does not perform the process of step S16 when the counter value Cptc is "0".

When operation of the motor 13 is suspended, in step S12 and S14, the lock control unit 14 first determines whether or not the first subtraction time interval Ts1 or the second subtraction time interval Ts2 has elapsed from when the operation of the motor 13 was suspended.

In this manner, if the counter value Cptc is "45" or greater, the lock control unit 14 subtracts the counter value Cptc whenever the first subtraction time interval Ts1 elapses. If the counter value Cptc is less than "45", the lock control unit 14 subtracts the counter value Cptc whenever the second subtraction time interval Ts2 elapses.

After the subtraction process of the counter value Cptc, the lock control unit 14 determines whether the counter value Cptc is less than or equal to an invalidation threshold value Cth. The invalidation threshold value Cth is set by subtracting from the operation suspension threshold value Cmax the counter value Cptc corresponding to the time required for the motor 13 to move the lock pin 12 from the lock position to the unlock position or from the unlock position to the lock position (hereafter referred to as minimum movement time). In the preferred embodiment, the minimum operation time is 300 milliseconds. Thus, in the preferred embodiment, the invalidation threshold value Cth is 82, which is calculated by the equation shown below.

$$95 \text{ (operation suspension threshold value Cmax)} - (300/24) \approx 82$$

When the counter value Cptc is less than or equal to the invalidation threshold value Cth in step S7, the lock control unit 14 validates the motor operation signal in step S8 and then temporarily terminates processing. In other words, the lock control unit 14 subsequently controls the motor 13 in accordance with the motor operation signal. If the counter value Cptc is greater than the invalidation threshold value Cth in step S7, the lock control unit 14 invalidates the motor operation signal in step S9 and then temporarily terminates processing. In other words, when the motor 13 is being operated, the lock control unit 14 continues the operation of the motor 13. However, if the lock control unit 14 receives a new motor operation signal, the lock control unit 14 does not operate the motor 13. The lock control unit 14 then repeats the processes shown in FIGS. 2 and 3.

The operation of the steering lock apparatus 1 will now be discussed with reference to FIGS. 4, 5(a), and 5(b).

Figure 4:
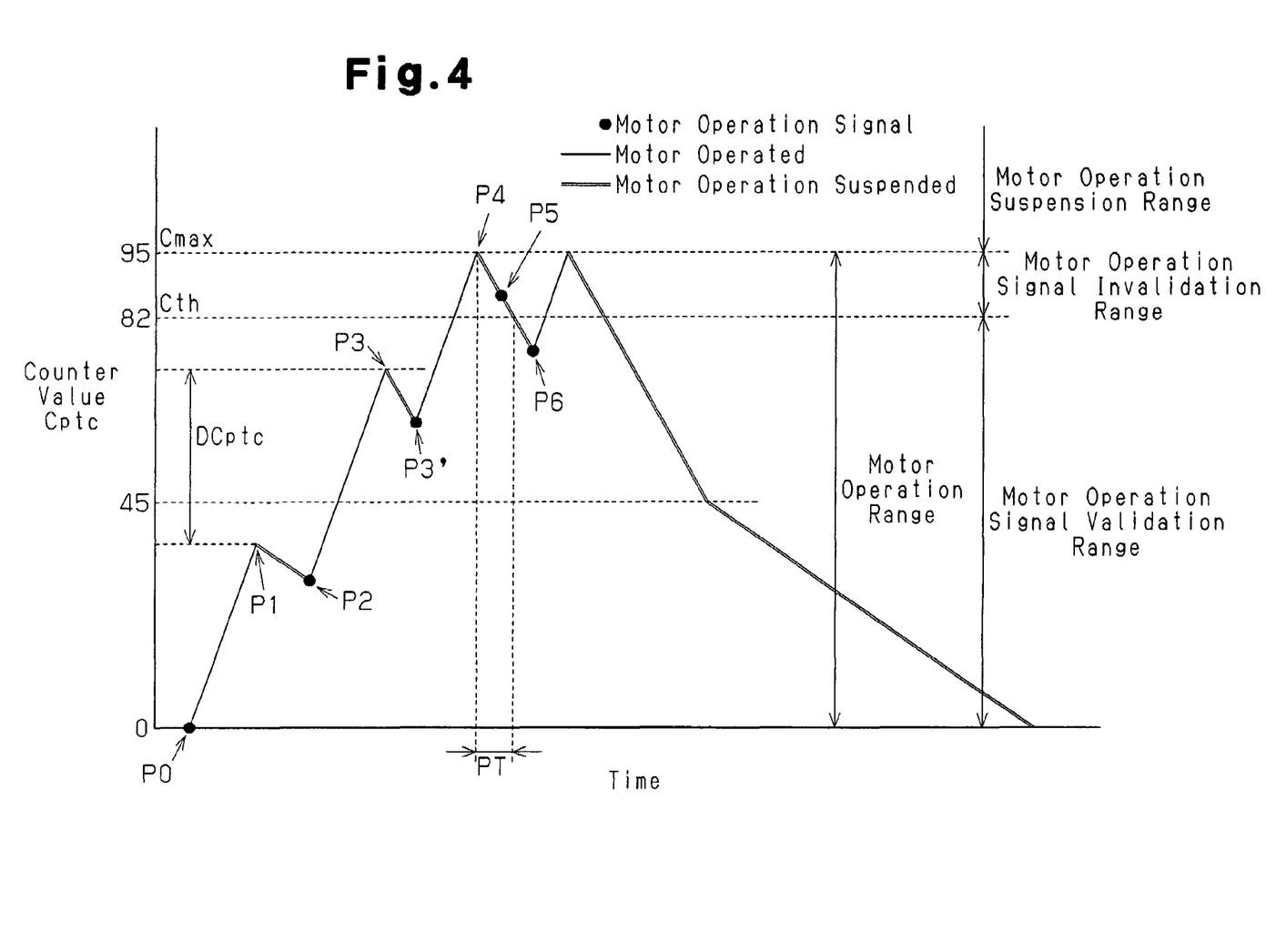
FIG. 4 is a time chart showing how overheat protection occurs in the preferred embodiment.
Figure 5A:
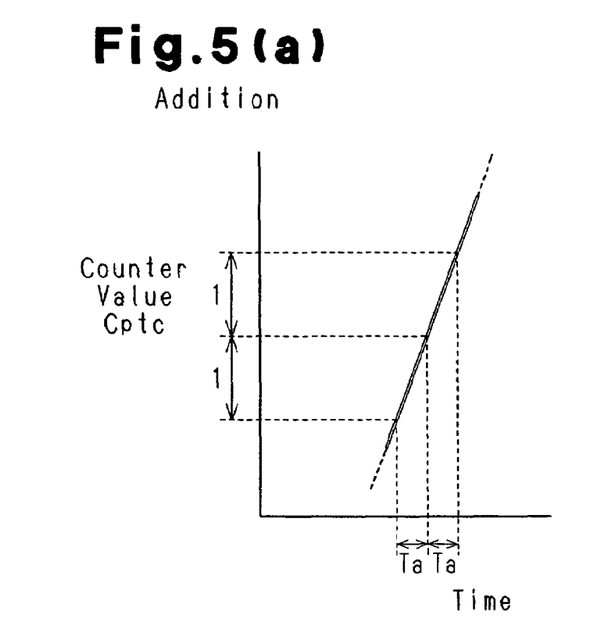
FIGS. 5(a) and 5(b) are graphs showing an addition process and the subtraction process executed by the lock control unit of the preferred embodiment.

At point P0 of FIG. 4, the motor 13 starts operation. The initial counter value Cptc at point P0 is "0". When the lock control unit 14 is provided with the motor operation signal, the lock control unit 14 operates the motor 13 in response to the motor operation signal. As the motor 13 operates, the lock control unit 14 increases the counter value Cptc by "1" whenever an addition time interval Ta elapses. More specifically, the lock control unit 14 adds "1" to the counter value Cptc whenever the addition time interval Ta elapses. That is, the operation time of the motor 13 is proportional to the counter value Cptc.

The lock control unit 14 acknowledges completion of the locking or unlocking of the steering shaft 11 and stops the operation of the motor 13. The lock control unit 14 acknowledges completion of the locking or unlocking based on the signal from the detection switch 16. When the motor 13 moves the lock pin 12, the movement of the lock pin 12 to a predetermined position may take too much time or be stopped by, for example, an excessive load. In such a case, the detection switch 16 does not provide the lock control unit 14 with a signal over a long period of time. Thus, the lock control unit 14 would keep operating the motor 13 for a long period of time. In other words, the motor 13 would be activated for a long period of time. To prevent thermal damage that may be inflicted by such long operation of the motor 13, the continuous operation time is limited to one second. Accordingly, the maximum counter value Cptc at point P1 in such a case would be "42" (1 second/24 milliseconds). That is, the incremented maximum counter value Cptc at point P1 in such a case is "42". The addition of "42" to the counter value Cptc corresponds to a state in which the temperature of the motor 13 is "42° C." higher than the prior operation temperature.

The lock control unit 14 stops the operation of the motor 13 at point P1 and decreases the counter value Cptc by "1" whenever the second subtraction time interval Ts2 (counter value Cptc being less than 45) elapses. The subtraction process performed by the lock control unit 14 will now be discussed.

Figure 5B:
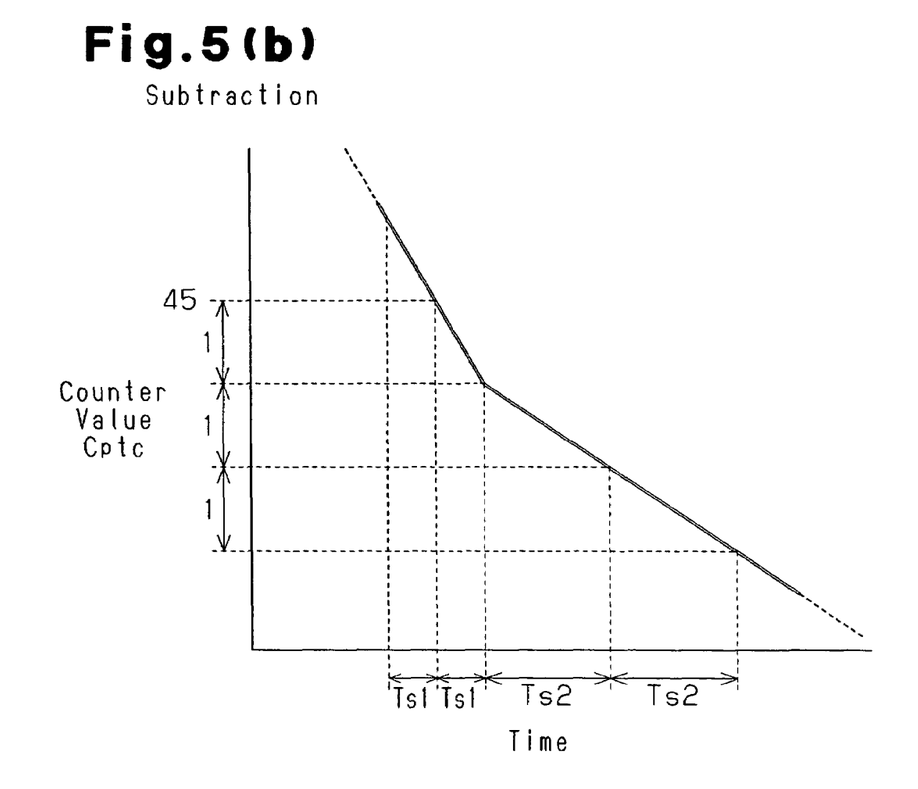

FIG. 5(b) shows changes in the counter value Cptc with respect to time after the operation of the motor 13 is suspended. The counter value Cptc is used to simulate the temperature of the motor 13. Thus, the inclination of the line in FIG. 5(b) indicates the temperature decrease rate of the motor 13. When the counter value Cptc is 45 or greater, the lock control unit 14 subtracts "1" from the counter value Cptc whenever the first subtraction time interval Ts1 elapses. When the counter value Cptc is less than "45", the lock control subtracts "1" from the counter value Cptc whenever the second subtraction time interval Ts2 elapses. In this manner, if the motor 13 is not operating, the lock control unit 14 subtracts "1" from the counter value Cptc when either the first subtraction time interval Ts1 or the second subtraction time interval Ts2 elapses in accordance with the present counter value Cptc. That is, the operation suspension time of the motor 13 is proportional to the counter value Cptc.

At point P2 in FIG. 4, the lock control unit 14 restarts the operation of the motor 13 when the lock control unit 14 is provided with the motor operation signal again.

The counter value Cptc at point P2 is less than the counter value Cptc at point P1. For example, if the motor 13 suspends operation for 110 seconds from point P1, the counter value Cptc undergoes the subtraction process ten times (110 seconds/11 seconds (subtraction time interval Ts2)). In this case, the counter value Cptc at point P2 would be the value obtained by subtracting "10" from the counter value Cptc at point P1. Since "10" is subtracted from the counter Cptc, the temperature of the motor 13 at point P2 is predicted to have decreased 10° C. from the temperature at point P1. When the motor operation signal is provided again to the lock control unit 14 at point P2, the lock control unit 14 operates the motor 13. Then, the lock control unit 14 adds "1" to the counter value Cptc whenever the addition time interval Ta elapses.

Subsequently, the lock control unit 14 suspends operation of the motor 13 at point P3 and then subtracts "1" from the counter value Cptc whenever the first subtraction time interval Ts1 elapses. The maximum counter value Cptc at point P3 is a value obtained by adding "42" to the counter value Cptc of point P2. If "42" has been added, it is predicted that the temperature of the motor 13 has been increased by 42° C. from the temperature at point P2.

When the temperature increase from point P2 to point P3 is greater than the temperature decrease from point P1 to point P2 as shown in FIG. 4, it is predicted that the temperature of the motor 13 has increased from the temperature at point P1 by a value corresponding to the difference DCptc between the counter values Cptc at points P1 and P3. In other words, it is predicted that the temperature of the motor 13 has increased from the prior operation temperature by a value corresponding to sum of the counter value Cptc at point 1 and the difference DCptc.

As described above, when the motor 13 is operating, the lock control unit 14 adds "1" to the counter value Cptc whenever the addition time interval Ta elapses. When the operation of the motor 13 is being suspended, the lock control unit 14 subtracts "1" from the counter value Cptc whenever the first subtraction time interval Ts1 or the second subtraction time interval Ts2 elapses.

At point P3' in which the counter value Cptc is less than the invalidation threshold value Cth, the lock control unit 14 is provided with the motor operation signal. Even if the counter value Cptc becomes greater than the invalidation threshold value Cth during operation of the motor 13, the lock control unit 14 continues to operate the motor 13. Afterwards, the lock control unit 14 forcibly suspends operation of the motor 13 when the counter value Cptc becomes greater than the operation suspension threshold value Cmax (point P4). If the lock control unit 14 is provided with the motor operation signal when the counter value Cptc is between the threshold value Cth and the operation suspension threshold value Cmax, the lock control unit 14 invalidates the motor operation signal and does not operate the motor 13. In other words, when the counter value Cptc exceeds the invalidation threshold value Cth, the lock control unit 14 continues to operate the motor 13 but invalidates new motor operation signals.

After the operation of the motor 13 is forcibly suspended, the lock control unit 14 does not operate the motor 13 even when receiving the motor operation signal as long as the present counter value Cptc is greater than the invalidation value Cth. For example, when the motor operation signal is received at point P5, the present counter value Cptc is greater than the threshold value Cth. Thus, the lock control unit 14 invalidates the motor operation signal and does not operate the motor 13. That is, if the motor operation signal is received when the counter value Cptc is between the operation suspension threshold value Cmax and the invalidation threshold value Cth, the lock control unit 14 invalidates the motor operation signal and does not operate the motor 13.

Unless an invalidation period PT for ensuring the minimum operation time elapses from point P4, the lock control unit 14 does not operate the motor 13 even if the motor operation signal is received. In the preferred embodiment, the invalidation period PT is 6.5 seconds and obtained in the following manner:

0.5 seconds (first subtraction time interval Ts1)×13 (operation suspension threshold value Cmax−invalidation threshold value Cth)=6.5 seconds.

At point P6, when the motor operation signal is received, the invalidation period PT has elapsed and the present counter value Cptc is less than the invalidation threshold value Cth. Thus, the lock control unit 14 operates the motor 13 in response to the motor operation signal.

The steering lock apparatus 1 of the preferred embodiment has the advantages described below.

The lock control unit 14 uses the counter value Cptc to control the motor 13. The value of "1" is added to the counter value Cptc whenever the addition time interval Ta elapses during operation of the motor 13. Further, the value of "1" is subtracted from the counter value Cptc whenever the first subtraction time interval Ts1 or the second subtraction time interval Ts2 elapses during operation suspension of the motor 13. That is, the counter value Cptc increases in proportion to the operation time of the motor 13 and decreases in proportion to the operation suspension time of the motor 13. Accordingly, the counter value Cptc simulates the temperature of the motor 13. In response to the motor operation signal, the lock control unit 14 operates the motor 13 and adds "1" to the counter value Cptc whenever the addition time interval Ta elapses. When the counter value Cptc, which changes whenever the addition time interval Ta elapses, exceeds the operation suspension threshold value Cmax, the lock control unit 14 presumes that the rise in the temperature of the motor 13 is excessive and forcibly suspends the operation of the motor 13. The motor operation suspension prevents thermal damage that may be caused by the temperature increase of the motor 13. Further, the motor 13 does not have to be provided with an overheat protection device. Thus, the steering lock apparatus 1 does not have to be enlarged and costs may be kept low.

If the lock control unit 14 receives the motor operation signal when the counter value Cptc is between the invalidation threshold value Cth and the operation suspension threshold value Cmax, the lock control unit 14 invalidates the motor operation signal and does not operate the motor 13. The invalidation threshold Cth is set by subtracting from the operation suspension threshold value Cmax the counter value Cptc corresponding to the time required for the motor 13 to move the lock pin 12 from the lock position to the unlock position or from the unlock position to the lock position (minimum movement time). Thus, the lock control unit 14 does not operate the motor 13 when the counter value Cptc is greater than the invalidation threshold value Cth. This prevents the locking or unlocking of the steering shaft 11 from being incomplete. If the motor operation signal were not invalidated and the motor operation signal were received, for example, at point P5 in FIG. 4, the lock control unit 14 would operate the motor 13 just for a short period and then suspend operation of the motor 13. If another motor operation signal were received immediately afterward, the lock control unit 14 would operate the motor 13 again for only a short period of time. In such a case, the locking or unlocking of the steering shaft 11 continues to be incomplete. However, the invalidation threshold value Cth, which is smaller than the operation suspension threshold value Cmax, is used in the preferred embodiment. In addition, the lock control unit 14 does not operate the motor 13 when the counter value Cptc is between the operation suspension value Cmax and the invalidation threshold value Cth. Accordingly, in the steering lock apparatus 1, the locking and unlocking of the steering shaft 11 is prevented from being continuously incomplete.

The invalidation threshold Cth is set by subtracting from the operation suspension threshold value Cmax the counter value Cptc corresponding to the time required for the motor 13 to move the lock pin 12 from the lock position to the unlock position or from the unlock position to the lock position. Thus, if the lock control unit 14 receives the motor operation signal when the counter value Cptc is less than the invalidation threshold value Cth, the lock control unit 14 operates the motor 13 and moves the lock pin 12 to the lock position or the unlock position. Such control prevents incomplete locking or unlocking of the steering shaft 11.

The lock control unit 14 adds "1" to the counter value Cptc whenever the addition time interval Ta elapses during operation of the motor 13. Further, the lock control unit 14 subtracts "1" from the counter value Cptc whenever the first subtraction time interval Ts1 or the second subtraction time interval elapses during operation suspension of the motor 13. That is, the lock control unit 14 performs a simple calculation in which the counter value Cptc is added or subtracted in predetermined time intervals to predict the temperature of the motor 13. This decreases the control load applied to the lock control unit 14.

The operation suspension threshold value Cmax is the counter value Cptc at which the operation of the motor 13 is forcibly suspended. Since the initial counter value Cptc is "0", the operation suspension threshold value Cmax corresponds to the tolerated temperature increase range of the motor 13. In the preferred embodiment, the initial value "0" of the counter value Cptc corresponds to "85° C.", which is set under the assumption that the motor 13 is operated under the worst environmental temperature. Further, the guaranteed operational upper temperature limit of the motor 13 is assumed to be 180° C. As a result, the operation suspension threshold value Cmax is set at "95". When the temperature of the environment in which the motor 13 is used is less than 85° C., the operation of the motor 13 is forcibly suspended when the counter value Cptc exceeds the operation suspension threshold value Cmax even if the actual temperature of the motor 13 is lower than 180° C. In other words, as the prior operation temperature of the motor 13 becomes lower, protection of the motor 13 from thermal damage is further ensured. Moreover, the operation suspension threshold value Cmax is set assuming that the motor 13 is operated under the worst environmental temperature. This prevents the motor 13 from failing to function normally due to thermal damage even if the motor 13 is operated under the worst environmental temperature.

It should be apparent to those skilled in the art that the present invention may be embodied in many other specific forms without departing from the spirit or scope of the invention. Particularly, it should be understood that the present invention may be embodied in the following forms.

The operation suspension threshold value Cmax may be set at a value other than "95". The operation suspension value Cmax my be set in accordance with the initial counter value Cptc. For example, the initial counter value Cptc may be set at "85", and the operation suspension threshold value Cmax may be set at "180". It is preferred that the operation suspension threshold value Cmax be set so that the difference between the operation suspension threshold value Cmax and the initial counter value Cptc is "95".

Alternatively, the operation suspension threshold value Cmax may be set so that the difference between the operation suspension threshold value Cmax and the initial counter value Cptc is greater than "95". This would make the operation suspension threshold value Cmax difficult to be reached and further ensure the locking or unlocking of the steering shaft 11. On the other hand, the operation suspension threshold value Cmax may be set so that the difference between the operation suspension threshold value Cmax and the initial counter value Cptc is less than "95". This would ensure that the motor 13 is not heated to a high temperature and further protect the motor 13 from thermal damage.

The invalidation threshold value Cth may be set to a value other than "82". As long as the difference between the operation suspension threshold value Cmax and the invalidation threshold value Cth is "13" and the same as the preferred embodiment, the locking and unlocking of the steering shaft 11 by the lock control unit 14 is ensured. As long as the difference between the invalidation threshold value Cth and the operation suspension threshold value Cmax is ensured, the invalidation threshold value Cth may be set as a large value or a small value in accordance with the operation suspension value Cmax. For example, if the operation suspension threshold value Cmax is set to "105", the invalidation threshold value Cth may be set to "92".

The difference between the operation suspension threshold value Cmax and the invalidation threshold value Cth may be greater than "13". This would further ensure that the lock control unit 14 moves the lock pin 12 with the motor 13 from the lock position to the unlock position or from the unlock position to the lock position. Accordingly, prevention of incomplete locking or unlocking of the steering shaft 11 would further be ensured. On the other hand, the difference between the operation suspension threshold value Cmax and the invalidation threshold value Cth may be less than "13". In this case, the smaller difference between the operation suspension value Cmax and the invalidation threshold value Cth would validate the motor operation signal at an earlier stage after operation of the motor 13 is forcibly stopped. Such control would improve the response of the motor 13 with respect to an operation request.

Multiple addition time intervals may be set for the counter value Cptc. For example, the range of the counter value Cptc may be divided into two stages. An addition time interval Ta1 is set for the first stage, and an addition time interval Ta2 is set for the second stage (Ta1>Ta2). When the counter value Cptc is in the first stage, the lock control unit 14 adds "1" to the counter value Cptc whenever the addition time interval Ta1 elapses. When the counter value Cptc is in the second stage, the lock control unit 14 adds "1" to the counter value Cptc whenever the addition time interval Ta2 elapses. Alternatively, three or more addition time intervals may be set for the counter value Cptc. Further, instead of using two subtraction time intervals, three or more subtraction time intervals may be used. By using multiple addition time intervals and subtraction time intervals, the counter value Cptc would simulate the temperature of the motor 13 more accurately. This would enable the motor 13 to be controlled more accurately in accordance with the temperature of the motor 13.

The addition time interval and subtraction time interval of the counter value Cptc may be the same. This would facilitate calculation of the counter value Cptc and further reduce the control load applied to the lock control unit 14.

The value added to the counter value Cptc does not have to be "1" and may be varied in a stepped manner in accordance with the counter value Cptc. For example, when the counter value Cptc is less than a predetermined value, "2" may be added to the counter value Cptc whenever the addition time interval elapses, and when the counter value Cptc is greater than or equal to the predetermined value, "1" may be added to the counter value Cptc whenever the addition time interval elapses. Further, the value subtracted from the counter value Cptc may be varied in a stepped manner. For example, when the counter value Cptc is greater than or equal to a predetermined value, "4" may be subtracted from the counter value Cptc whenever the subtraction time interval elapses, and when the counter value Cptc is less than the predetermined value, "3" may be subtracted from the counter value Cptc whenever the addition time interval elapses. The value added to or subtracted from the counter value Cptc may be values other than those described above. Further, the value that is added or subtracted may be varied between three values in accordance with the counter value Cptc.

The initial counter value Cptc may be set in correspondence with the temperature of the motor prior to operation (prior operation temperature). In this case, the counter value Cptc would represent the predicted temperature (° C.) of the motor 13.

The counter value Cptc does not have to be used to calculate the predicted temperature of the motor 13. For example, a value obtained by subtracting the product of a predetermined constant and the time during which the operation of the motor 13 is suspended from the product of a predetermined constant and the time during which the motor 13 is operating may be used to predict the temperature of the motor 13. When performing such calculation, the temperature of the motor 13 is predicted when the lock control unit 14 receives the motor operation signal assuming that the operation time of the motor 13 for completing one action is constant. Accordingly, it may be determined from the calculation result whether the calculated value exceeds the operation suspension threshold value Cmax before the motor 13 starts operating. The lock control unit 14 operates the motor 13 until the calculated value exceeds the operation suspension threshold value Cmax.

Alternatively, when the lock control unit 14 determines that the calculated value is greater than the operation suspension threshold value Cmax, the lock control unit 14 immediately suspends operation of the motor 13.

The present examples and embodiments are to be considered as illustrative and not restrictive, and the invention is not to be limited to the details given herein, but may be modified within the scope and equivalence of the appended claims.

What is claimed is:

1. An electric steering lock apparatus for locking a steering shaft, the steering lock apparatus comprising:
    a lock pin engageable with the steering shaft to lock the steering shaft;
    an actuator for moving the lock pin between a lock position in which the lock pin is engaged with the steering shaft and an unlock position in which the lock pin is disengaged from the steering shaft; and
    a control unit for controlling the actuator, wherein the control unit generates a calculated value related to operation time of the actuator and suspends operation of the actuator when the calculated value is greater than a predetermined operation suspension threshold value, wherein the control unit controls the actuator in accordance with an actuator operation request and invalidates the actuator operation request when the calculated value is greater than an invalidation threshold value that is less than the operation suspension threshold value.

2. The steering lock apparatus according to claim 1, wherein the operation suspension threshold value corresponds to a tolerated upper temperature limit of the actuator.

3. The steering lock apparatus according to claim 1, wherein the invalidation threshold value is set by subtracting a value corresponding to operation time of the actuator required to enable the locking and unlocking of the steering shaft from the operation suspension threshold value.

4. The steering lack apparatus according to claim 1, wherein the control unit increases the calculated value whenever a predetermined first time interval elapses when the actuator is operating and decreases the calculated value whenever a predetermined second time interval elapses when the operation of the actuator is suspended.

5. The steering lock apparatus according to claim 4, wherein the control unit does not decrease the calculated value even if the predetermined second time interval elapses when the calculated value is equal to an initial value corresponding to the temperature of the actuator prior to operation.

6. The steering lock apparatus according to claim 4, wherein the control unit adds a value of one to the calculated value whenever the predetermined first time interval elapses and subtracts a value of one from the calculated value whenever the predetermined second time interval elapses.

7. The steering lock apparatus according to claim 4, wherein the predetermined first time interval is set in accordance with a temperature increase rate of the actuator, and the predetermined second time interval is set in accordance with a temperature decrease rate of the actuator.

8. The steering lock apparatus according to claim 4, wherein the predetermined second time interval includes a predetermined third time interval that is set when the calculated value is a predetermined value or greater and a predetermined fourth time interval that is set when the calculated value is less than the predetermined value.

9. The steering lock apparatus according to claim 8 wherein the predetermined first time interval is 24 milliseconds 1 the predetermined third time interval is 0.5 seconds, and the predetermined fourth time interval is 11 seconds.

10. A method for controlling an actuator that drives a lock pin used to lock a steering shaft in an electric steering lock apparatus, the method comprising:
    determining whether the actuator is being operated to move the lock pin;
    increasing a calculated value by performing an addition when the actuator is operating;
    decreasing the calculated value by performing a subtraction when the operation of the actuator is suspended;
    suspending the operation of the actuator when the calculated value is greater than an operation suspension threshold value;

controlling the actuator in accordance with an operation request of the actuator; and invalidating the operation request of the actuator when the calculated value is greater than an invalidation threshold value that is less than the operation suspension threshold value.

11. The method according to claim 10, wherein the operation suspension threshold value corresponds to a tolerated upper temperature limit of the actuator.

12. The method according to claim 10, wherein the invalidation threshold value is set by subtracting a value corresponding to an operation time of the actuator required to enable the locking and unlocking of the steering shaft from the operation suspension threshold value.

13. The method according to claim 10, wherein:

said increasing a calculated value includes increasing the calculated value whenever a predetermined first time interval elapses when the actuator is operating; and said decreasing the calculated value includes decreasing the calculated value whenever a predetermined second time interval elapses when the operation or the actuator is suspended.

14. The method according to claim 13, wherein said decreasing the calculated value includes not decreasing the calculated value even if the predetermined second time interval elapses when the calculated value is equal to an initial value corresponding to the temperature of the actuator prior to operation.

15. The method according to claim 13, wherein:

said increasing the calculated value includes adding a value of one to the calculated value whenever the predetermined first time interval elapses; and said decreasing the calculated value includes subtracting a value of one from" the calculated value whenever the predetermined second time interval elapses.

16. The method according to claim 13, wherein the predetermined first time interval is set in accordance with a temperature increase rate of the actuator, and the predetermined second time interval is set in accordance with a temperature decrease rate of the actuator.

17. The method according to claim 13, wherein the predetermined second time interval includes a predetermined third time interval that is set when the calculated value is a predetermined value or greater and a predetermined fourth time interval that is set when the calculated value is less than the predetermined value.

18. The method according to claim 17, wherein the predetermined first time interval is 24 milliseconds, the predetermined third time interval is 0.5 seconds, and the predetermined fourth time interval is 11 seconds.

* * * * *